US007992002B2

(12) United States Patent
Bradbury

(10) Patent No.: US 7,992,002 B2
(45) Date of Patent: Aug. 2, 2011

(54) DATA DEPOSITORY AND ASSOCIATED METHODOLOGY PROVIDING SECURE ACCESS PURSUANT TO COMPLIANCE STANDARD CONFORMITY

(75) Inventor: Bruce W. Bradbury, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1223 days.

(21) Appl. No.: 11/456,165

(22) Filed: Jul. 7, 2006

(65) Prior Publication Data

US 2008/0022382 A1   Jan. 24, 2008

(51) Int. Cl.
| G06F 17/30 | (2006.01) |
| G06F 7/04 | (2006.01) |
| G06F 21/00 | (2006.01) |
| G06F 15/16 | (2006.01) |
| H04N 7/167 | (2011.01) |

(52) U.S. Cl. ........... 713/175; 726/2; 726/10; 705/51; 380/201; 709/229

(58) Field of Classification Search ............ 726/2, 10
See application file for complete search history.

(56) References Cited

U.S. PATENT DOCUMENTS

| 6,131,090 | A | * | 10/2000 | Basso et al. ............ 706/23 |
| 6,202,149 | B1 | * | 3/2001 | Hedegard ............ 713/100 |
| 6,263,433 | B1 | * | 7/2001 | Robinson et al. ........ 713/100 |
| 6,845,448 | B1 | * | 1/2005 | Chaganti et al. ........ 713/166 |
| 7,328,276 | B2 | * | 2/2008 | Alisuag ............ 709/237 |
| 7,680,819 | B1 | * | 3/2010 | Mellmer et al. ......... 707/783 |
| 2002/0004727 | A1 | * | 1/2002 | Knaus et al. .......... 705/3 |
| 2002/0010679 | A1 | * | 1/2002 | Felsher .............. 705/51 |
| 2002/0184068 | A1 | * | 12/2002 | Krishnan et al. ........ 705/8 |
| 2003/0023562 | A1 | * | 1/2003 | Bailey et al. .......... 705/51 |
| 2003/0088771 | A1 | * | 5/2003 | Merchen ............ 713/175 |
| 2003/0200182 | A1 | * | 10/2003 | Truitt et al. .......... 705/75 |
| 2005/0102534 | A1 | * | 5/2005 | Wong .............. 713/201 |
| 2005/0125547 | A1 | * | 6/2005 | Ahonen ............ 709/228 |
| 2005/0154614 | A1 | * | 7/2005 | Swanson et al. ........ 705/3 |
| 2005/0209893 | A1 | * | 9/2005 | Nahra et al. ......... 705/4 |
| 2006/0004820 | A1 | * | 1/2006 | Claudatos et al. ........ 707/101 |
| 2006/0074712 | A1 | * | 4/2006 | Jorgensen et al. ....... 705/2 |
| 2006/0229911 | A1 | * | 10/2006 | Gropper et al. ........ 705/2 |
| 2007/0162452 | A1 | * | 7/2007 | Becker ............. 707/10 |
| 2008/0052772 | A1 | * | 2/2008 | Conrado et al. ........ 726/10 |

FOREIGN PATENT DOCUMENTS

WO    WO 2004102329 A2 * 11/2004

OTHER PUBLICATIONS

Wang et al, Personal health information management system and its application in referral management, Information Technology in Biomedicine, IEEE Transactions on, Publication Date: Sep. 2004, vol. 8, Issue: 3, On pp. 287-297.*

* cited by examiner

Primary Examiner — Taghi Arani
Assistant Examiner — Morshed Mehedi

(57) ABSTRACT

A secure data depository assembly, and an associated method, provides for storage of data at a secured location forming a vault. Data associated with any of various compliance standards, such as the HIPAA (Health Insurance Portability and Accountability Act) and the PCI (Payment Card Industry) data security standard is stored at sub-vaults defined at the vault. An access controller controls access to the sub-vaults and the data stored thereat. Remote requests generated remote from the vault are routed by way of a packet data network, and, if appropriate, the access controller provides access to the vault and sub-vault contents pursuant to the request.

19 Claims, 3 Drawing Sheets

DATA DEPOSITORY AND ASSOCIATED METHODOLOGY PROVIDING SECURE ACCESS PURSUANT TO COMPLIANCE STANDARD CONFORMITY

The present invention relates generally to mass storage of data, such as data collected, operated upon, and used in conformity with a compliance standard that sets forth rules pertaining to access to, and use of, data. More particularly, the present invention relates to an assembly, apparatus, and an associated methodology, that provides multiple databases at a secure location, each individual database selectably accessible in conformity with a compliance standard with which the individual database is associated. Sensitive data is stored at a database positioned at the secure location in conformity with an associated compliance standard.

By maintaining the databases at a common location and permitting shared access to the databases by clients, the costs associated with storing, maintaining, and using data in conformity with a compliance standard, such as the HIPAA (Health Insurance Portability and Accountability Act) or the PCI (Payment Card Industry) data security standard, are shared amongst the clients.

BACKGROUND OF THE INVENTION

The need to collect and store data, available for later processing and retrieval, is commonplace in modern society. Advancements in digital technologies and in mass storage technologies have permitted the development and deployment of sophisticated data storage and processing mechanisms whose construction and deployment provides for the collection, processing, and retrieval of data. Storage capacities of data storage devices have significantly increased over the years. And, such increase has been concomitant with an increase in realizable storage capacity with decrease in the costs of the storage mechanisms. Arrangements providing for storage of many terabytes of data, storable with redundancy, are readily realizable, permitting of large amounts of data.

The ability to store large amounts of data provides many conveniences and permits the speedy performance of many services, a large number of which were previously wholly unavailable and others of which were available only with significant levels of lag time. The capability of storage systems now to store large amounts of data, readily retrievable in a real-time manner, however, provides various security and privacy-related challenges.

The data, if not properly secured and permitting of controlled access, might be accessed by unauthorized parties and used in unauthorized, if not nefarious, manner.

Various regulatory entities, both governmental agencies and industry groups, have promulgated standards related to data storage and accessibility. The payment card industry (PCI) data security standard and the Health Insurance Portability and Accountability Act (HIPAA) are exemplary of promulgations that, amongst other things, set forth compliance standards relating to data security and accessibility. Compliance with the security and privacy requirements are sometimes burdensome. Administrative effort and costs are typically required for personnel of an organization to become cognizant of the specifics of the relevant promulgations and also to maintain proficiency as the promulgations change over time. And, additional costs are associated with implementing procedures that are in conformity with the compliance standards. The various costs are so significant that conformity with the compliance rules is difficult for an organization to ensure.

Knowledge of the rules of a compliance standard as well as equipment and procedures needed to be carried out to operate upon data in conformity with the compliance standards are generally similar for different organizations that deal in the same product or service area. While the costs associated with conformance with the compliance standard for a single organization might be overwhelmingly burdensome, sharing the compliance costs across a group of organizations would be less burdensome and more manageable. To date, however, no such scheme has been set forth.

It would be advantageous if a manner could be provided by which to provide a scheme by which more economically to permit an organization to conform to compliance standards pertaining to security and privacy of data.

It is in light of this background information related to data storage and manipulation that the significant improvements of the present invention have evolved.

SUMMARY OF THE INVENTION

The present invention, accordingly, advantageously provides an assembly, apparatus, and an associated methodology for facilitating mass storage, and use, of data, such as data collected, operated upon, and used in conformity with a compliance standard that sets forth rules pertaining to access to, and use of, data.

Through operation of an embodiment of the present invention, a manner is provided having multiple databases embodied at a secure location. Each individual database is selectably accessible in conformity with a compliance standard with which the individual database is associated.

Costs associated with storing, maintaining, and using data in conformity with a compliance standard are shared amongst clients as the databases are embodied and maintained at a common location to permit the shared access to the databases by the clients.

In another aspect of the present invention, a secure location is used to form a vault location at which database storage elements such as computer servers, are positioned and operated. The positioning of the database storage devices at the vault provides a physical barrier to access to the computer servers or other storage devices that are used to store data. Any appropriate number of computer data storage devices, either separate entities or virtual-separate entities, is positioned at the vault location. The vault formed at the vault location is, e.g., expandable to permit subsequent installation of additional computer servers or other database storage devices.

The data storage elements are sub-vaults positioned and maintained in the vault forming databases, the contents of which are selectably accessible to permit reading, writing, and manipulation operations to be performed to view, store, and process data. The data is data associated with any of the various compliance standards. That is to say, the data that is stored, accessed, and manipulated in manners in conformity with a relevant, compliance standard. Access to the data storage element, and data stored thereat, is limited with access allowable only in accordance with the access permitted by the relevant compliance standard.

In another aspect of the present invention, an access controller controls access to the computer servers, or other storage elements, positioned at the vault. The access controller receives requests for access to the databases of the vault and acts to control access to the databases. That is to say, the access controller operates to approve the request, or to deny a request, for access to a database. The rules pursuant to which the access controller operates correspond to the rules set forth in the relevant compliance standard associated with the database. The access controller thereby controls both access to the vault and also, further, access to the databases maintained thereat. The access controller is, e.g., positioned behind a firewall that is connected to a data network, such as the Internet. And, a request is generated by a client by way of a device connected to the data network, such as the Internet, and routed to the access controller. A client is also able to generate a request for access by way of a private network, or other network, to request access to a database maintained at a vault.

In another aspect of the present invention, the access controller assigns an identifier to a client that is to use a sub-vault to access and to store data therein. The identifier is a unique, but non-identifying key and is used to map to actual keys and the database data at the vault that contains sensitive data.

In another aspect of the present invention, the access controller authenticates the request to confirm that it is coming from a valid client. Confirmation is made via certificate. This security authentication function is common to all sub-vaults. This does not require any knowledge of the content of a request to access, nor the requirement of the relevant compliance. A sub-vault will further include another layer of authentication that will validate the contents of the request and the functions allowed.

In another aspect of the present invention, the access controller generates an issue certificate that is provided to a client that is to be authorized to access a database of the vault. The certificate is issued, for instance, in response to a client request for access. And, the certificate, once returned to the client, is used by the client as part of a standard services request sent, e.g., by a HTTPS protocol. The request also includes the identity of the requestor, i.e., the client. The access controller permits, or denies, the request responsive to the contents of the request, namely, the client identifier and the certificate. In a further aspect, the access controller controls the type of access that an authorized client is permitted of the requested database. That is to say, the access controller is further capable of permitting read-only, or other limited access to the database contents, depending upon the client and the issued certificate. When the access controller determines the client request to be appropriate, routing, such as by way of a router, to the database, such as to the computer server at which the database is formed and maintained.

Multiple levels of security are thereby provided. Security to access the vault and also security to access a sub-vault, that is to say, the database or computer server at which the database is embodied, are both required. A vault-level of security is provided, and a sub-vault level of security is also provided.

In a further aspect of the present invention, an auditor is further provided that maintains an audit record of accesses to the databases. The audit record formed by the auditor is also selectably accessible, again by way of the access controller. The audit record, in one implementation, also records denied requests for access to a database.

In these and other aspects, therefore, a secure data depository assembly, and an associated methodology, is provided. The secured data depository assembly includes a host vault. A first sub-vault database is configured to store first data associated with a first compliance standard at the post-vault. And, a second sub-vault database is configured to store second data associated with a second compliance standard at the host vault. An access controller is adapted to receive client requests to access selected sub-vault database of the first and second databases. The access controller is configured to control client access to both the host vault and to the selected sub-vault responsive to the client requests.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
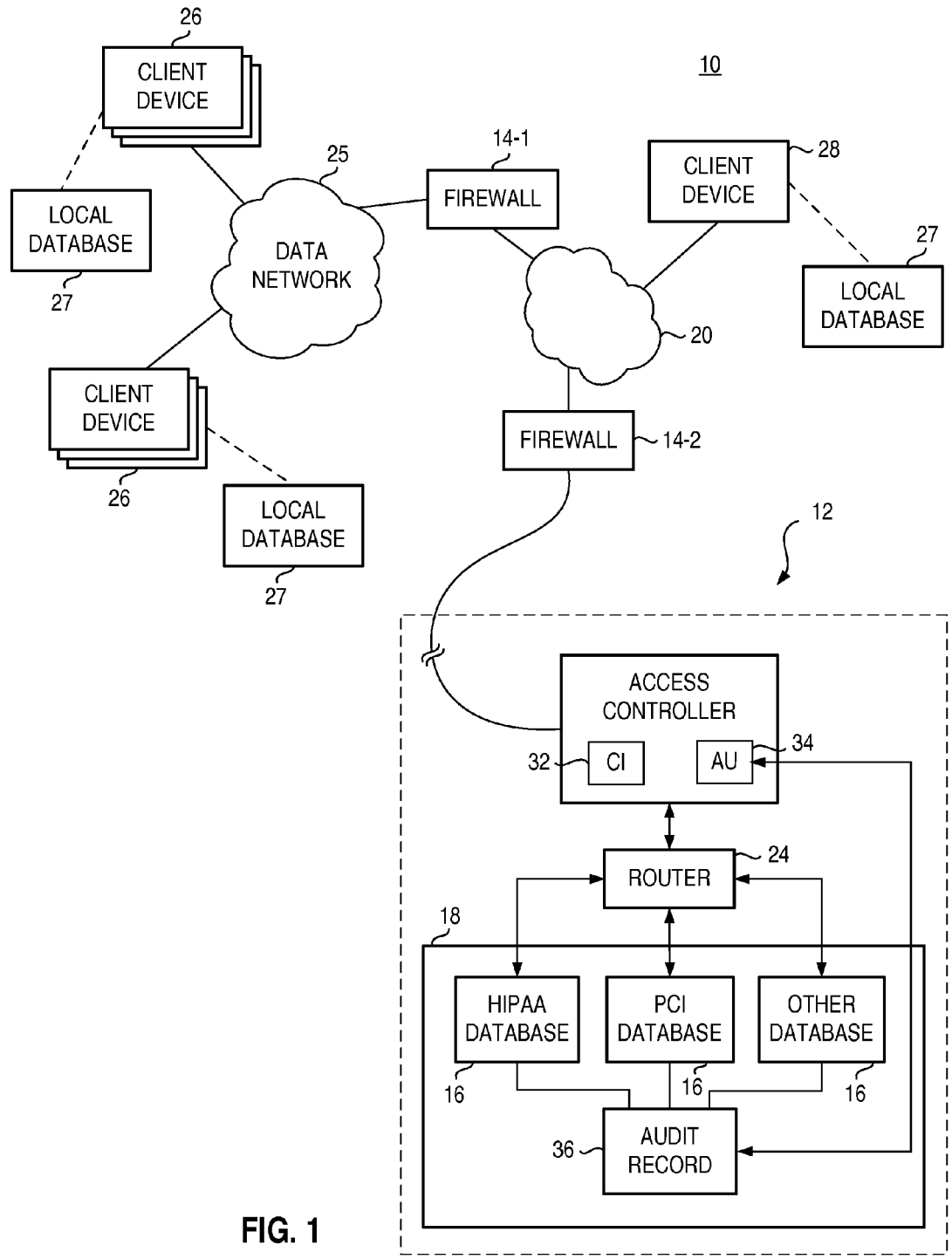
FIG. 1 illustrates a functional block diagram of an assembly of an embodiment of the present invention accessible by a client that generates a client request.

Turning first to FIG. 1, an arrangement, shown generally at 10, includes an assembly 12 of an embodiment of the present invention. The assembly is constructed behind one or more firewalls 14, and the assembly includes data storage elements 16 positioned at a physically isolated area 18 defining a vault, also referred to herein as a vault location. In the exemplary implementation, a data storage element 16 comprises one or more computer servers containing memory elements of memory capacities appropriate for storing data that defines databases. In the exemplary implementation, while the area forming the vault is physically isolated, the area is permitting of expansion of the data storage elements positioned thereat to provide for scalability of the storage capacity of the storage elements both to permit an increase in the permitted size of a database as well as to permit increase in the number of databases maintainable at the vault. When the data storage elements are implemented as one or more computer servers, for purposes of access speed and redundancy, multiple storage disks or servers are regularly advantageous.

The assembly further includes an access controller 22 coupled to a firewall 14. In the illustrated embodiment, two firewalls, firewalls 14-1 and 14-2, are utilized. The firewalls are connected by way of a network part 20, e.g., a local area network. The access controller is coupled to the second firewall 14-2. The access controller operates to control access to the vault 18 and to the data storage elements 16 therein. The access controller is coupled to a router 24, of conventional configuration, that, in turn, is coupled to the data storage elements.

In the exemplary implementation in which a pair of firewalls 14-1 and 14-2 are utilized, network portions positioned between the firewalls define a DMZ (demilitarized zone). And, the outer firewall 14-1 is connected to the data network, here shown at 25 to which client devices 26 are connected. The client devices form, for instance, computer workstations that are operated by clients. The client devices are thereby positioned in communication connectivity with the access controller by way of the data network and the firewalls. Local databases 27 are shown in connectivity with the client devices 26.

A client device 28 is further shown in the figure, connected to the network part 20 positioned between the firewalls. The client device 28 is here representative of an organizational client, that is to say, a client of the same organization that maintains and operates the assembly 12 or other entity that is positioned behind the outer firewall 14-1. The client device also is positionable in communication connectivity with the access controller, here by way of the inner firewall 14-2. A local database 27 is also shown in connectivity with the client device 28.

The data storage elements, howsoever implemented, pursuant to an embodiment of the present invention, are used to store and to permit manipulation of data associated with any of the various compliance standards. For instance, and as shown in the exemplary implementation, the left-most (as shown) data storage element is associated with an HIPAA (Health Insurance Portability and Accountability Act) compliance standard. That is to say, the data stored at such data storage element is accessible and manipulated in conformity with security and privacy rules set forth in the HIPAA. The center-most (as shown) data storage element is associated with a PCI (payment card industry) data security standard compliance standard. That is to say, data stored at such a data storage element is accessible and manipulated in conformity with the security and privacy rules set forth in the PCI data security standard. And, the right-most (as shown) data storage element 16 is associated with other sensitive information requirements. That is to say, data stored at such data storage element is accessed and manipulated in conformity with the associated sensitive information requirements.

In operation, a client, using a client device 26 or 28, requests access to a selected data storage element for any of various purposes, such as, e.g., to store data, to manipulate stored data, or to read data stored at a data storage element 16. The request is routed to the assembly 12, and once delivered to the access controller 22, the request is acted upon. The access controller acts to accept the request or to reject the request. If the request is rejected, access to the requested data storage element is denied. If, conversely, the client request is accepted, the access controller provides access by the client device to the vault and the selected data storage element thereof. And, in all cases, audit entries are logged.

In operation of the exemplary implementation, the access controller further includes a certificate issuer (CI) represented by the block 32 in FIG. 1. When a client device sends a client request, the certificate issuer generates a certificate for issuance to the requester, if appropriate. The certificate is then used by the client device in a subsequent client request message together with a client identifier to request access to a database embodied at a data storage element 16. The access controller grants, or denies, access to the database based upon the values of the client identifier and the issued certificate contained in the client request. The certificate identifies a requester (client) and comprises, e.g., a conventional, SSL certificate. An operator of the vault enters into an agreement with a client and issues the certificate to the client. The certificate is used pursuant to all service requests to identify the requester and respondent.

In exemplary operation, a local database 27 is used to store non-sensitive data while a database formed of or at a sub-vault is used to store sensitive data. A identifier assigned to the client device is used in conjunction with the storage of the non-sensitive data at the local database and is used to map to actual keys at the sub-vault at which the sensitive data is stored. The identifier indexed together with the data stored at the local database is of the same identity as the identifier indexed together with the data stored at the sub-vault. This common indexing, using the same identifiers, provides a manner by which to associate locally-stored data with vault-stored data. Thereby, selected amounts of non-sensitive data are storable at the local databases while selected amounts of sensitive data are storable at the appropriate sub-vault. Data stored at the local database is easily available, and accessible for data mining, marketing, and other purposes while preserving the sensitive information at the sub-vault.

The assembly further includes an auditor (AU) 34. The auditor generates and maintains audit records of requests for access, and access grants, routed to, and granted by, the access controller. An audit record 36 is created and maintained. And, access to the audit records is also controlled by the access controller. That is to say, a client generates a request for access to, and review of, audit records pertaining to a database. If authorized, the access controller grants access to, and the audit records are accessible by, the requesting client.

Figure 2:
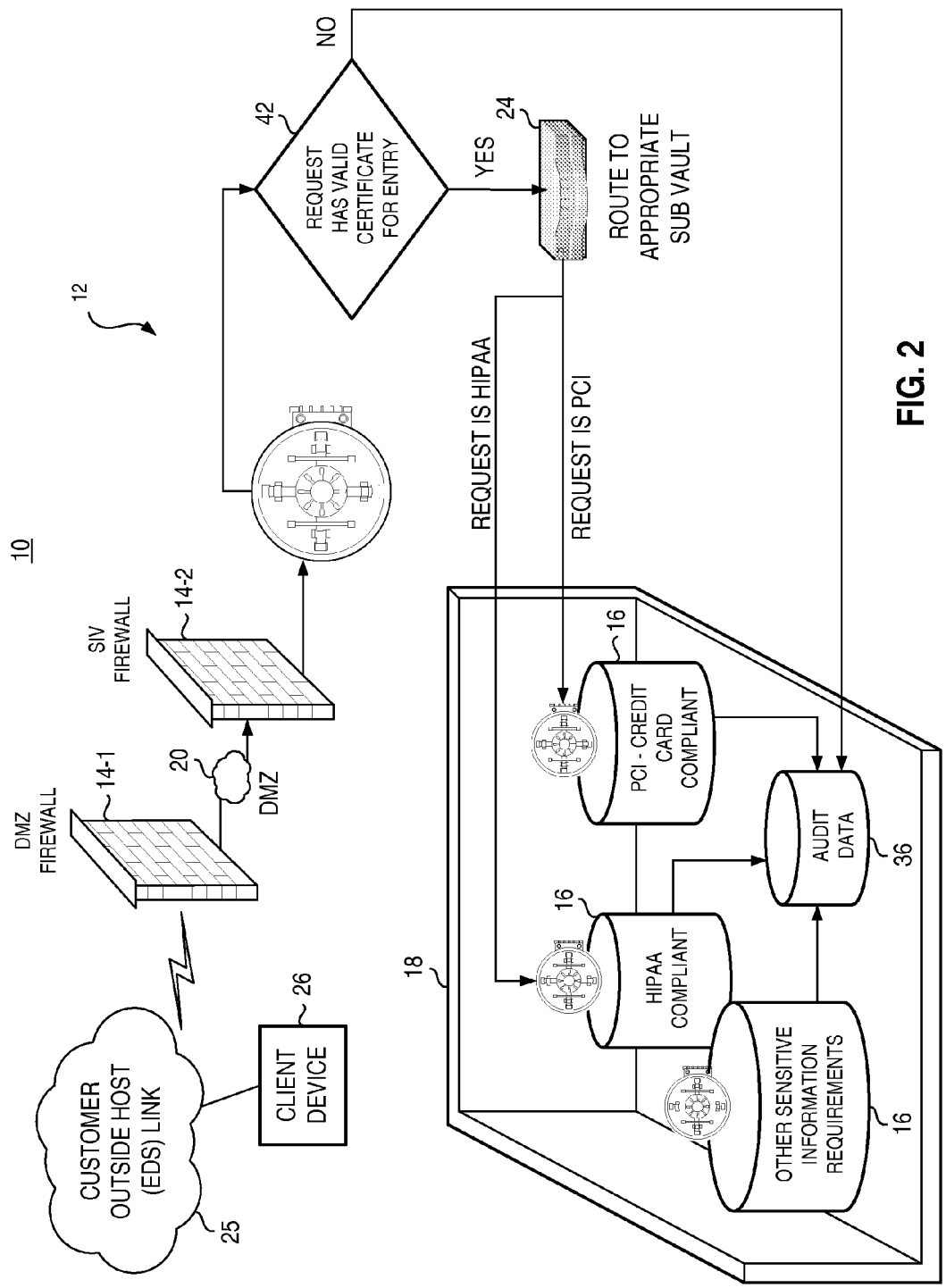
FIG. 2 illustrates a partial functional, partial perspective, partial process representation of the assembly shown in FIG. 1.

FIG. 2 again shows the arrangement 10 and the assembly 12 represented therein. Here, the vault 18 at which the database 16 and the audit records 36 are located is again illustrated. The vault is virtual in that the vault is defined both by physical segregation from an outside physical environment and network-segregated from the data network 24. The segregation is at least as great as segregation required to meet minimum storage and auditing requirements of a compliance standard.

The access controller 22 is again shown to be positioned behind an inner firewall 14-2 of a set of firewalls 14-1 and 14-2. The network portion 20 defining a DMZ extends between the set of firewalls. And, the outer firewall 14-1 is again shown to be connected to a data network 24 to which a client device 26 is connected.

By positioning the access controller to receive client requests, the access controller controls outside access to the databases embodied at the storage element 16. The data elements are representative of databases that store data associated with data created and utilized in conformity with different compliance standards. Compliance environments associated with individual ones of the databases extend common requirements provided by the access controller, i.e., "an outer vault", and the individual storage element 16 defines sub-vaults that provide additional functionality to meet specific requirements of database operation of databases created and manipulated in conformity with individual compliance standards.

When a request is generated by a client, the request is, e.g., a standard web services request with certification. The request is sent by way of, e.g., an HTTPS protocol. When delivered to the access controller, the controller grants access, i.e., entry, to the vault if the request contains a certificate provided by the host company to the requesting client. And, as indicated by the block 42, if the request has a valid certificate for entry, the access controller permits routing of the request, by way of the router, to a sub-vault formed of a data storage element 16. Auditing of the access is recorded at the audit record. And, if the request is denied, that is, the request does not include a valid certificate for entry, entry is denied and the attempt is also logged at the audit record.

The vault 18 is defined, and formed of, physical and virtual hardware, and software defining a network environment. The environment provides a standard web services interface that permits internal and external users, by way of the client devices 26 and 28, to utilize the service.

A unique, non-sensitive, data-identifying identifier is provided as a key to sensitive information stored within the vault. The identifier is used to associate stored sensitive data with users positioned remote from the vault. Clients request access to the service, and the host of the vault grants access and issues certificates to a requesting client. The requesting client uses the web services interface to manage sensitive information storable at, or stored at, the vault.

The vault accepts encrypted and audited (per compliance) data, e.g., formatted into data packets, that are unpacked and stored. And, a new identifier is created and returned to a client. The client thereby is not required to store any of the data locally but, instead, has a mapping between the client and the sensitive data of the client stored at the vault. Operations are further performable at the vault to execute functions that rely on the sensitive data.

Sub-vaults defined at the vault implement various compliance standards that are in addition to common standards met by the outer vault, that is to say, at the access controller. The outer vault provides common security and auditing processes. Requests are checked at the vault for the combination of client identifier and certificates. And, if approved, the requests are routed to an appropriate sub-vault.

Functionality of the sub-vaults is driven by individual compliance standards. For example, a PCI sub-vault provides services to generate a payment, return a masked number, match inputs to identifying information such as billing address, expiration date, etcetera, without returning any of the information to the client. The client is thereby freed up to maintain non-sensitive data in any application-specific way without the additional overhead and expense of conforming with the compliance standard.

Additionally, access is audited through operation of the auditor and generation of the audit records, in conformity with an associated compliance standard, and web services provide access to audit records when requested by a client.

The vault, and the assembly formed thereat, is extensible, permitting increased capacity to be handled through the addition of parallel hardware and processes.

By way of an example, credit card information is stored and accessed at the vault 18. When a client utilizes the services of the vault, the client sends, e.g., an enrollment request with credit card data, credit card number, credit card expiration date, security code, customer billing address, etc. Operation of the vault validates the request, stores the data, and returns a unique identifier to the client application of the client. The client application subsequently requests a transaction against the card. The operation of the vault validates the request, initiates the transaction on behalf of the client, and returns a unique identifier for the transaction. The client subsequently is able to query the vault for transaction information, audit trails, etcetera, utilizing the identifiers returned to the client. Particulars associated with credit card transactions are stored at the local database while identifying information, e.g., the credit card numbers are stored at the vault as well as any sensitive details relating to the transaction. The client uses the unique identifier assigned by the vault and associates the locally-stored data therewith. The client is freed of the need at the local database of compliance-standard compliance. The client is able, e.g., to request a subsequent payment with the same credit card without having the credit card information stored locally.

Analogously, in an ACH bank transaction, a client sends an enrollment request together with ACH account information. Account data is stored appropriately, and a unique identifier is returned to the client. The client is then able to request payments to be made against the account, and is able to query the vault for payment status, returns, etcetera, using identifiers generated by the vault. Vaults maintain relationships with financial institutions and provide services to the financial institutions. Clients maintain customer relationships and authorities to act on behalf of the customers.

Figure 3:
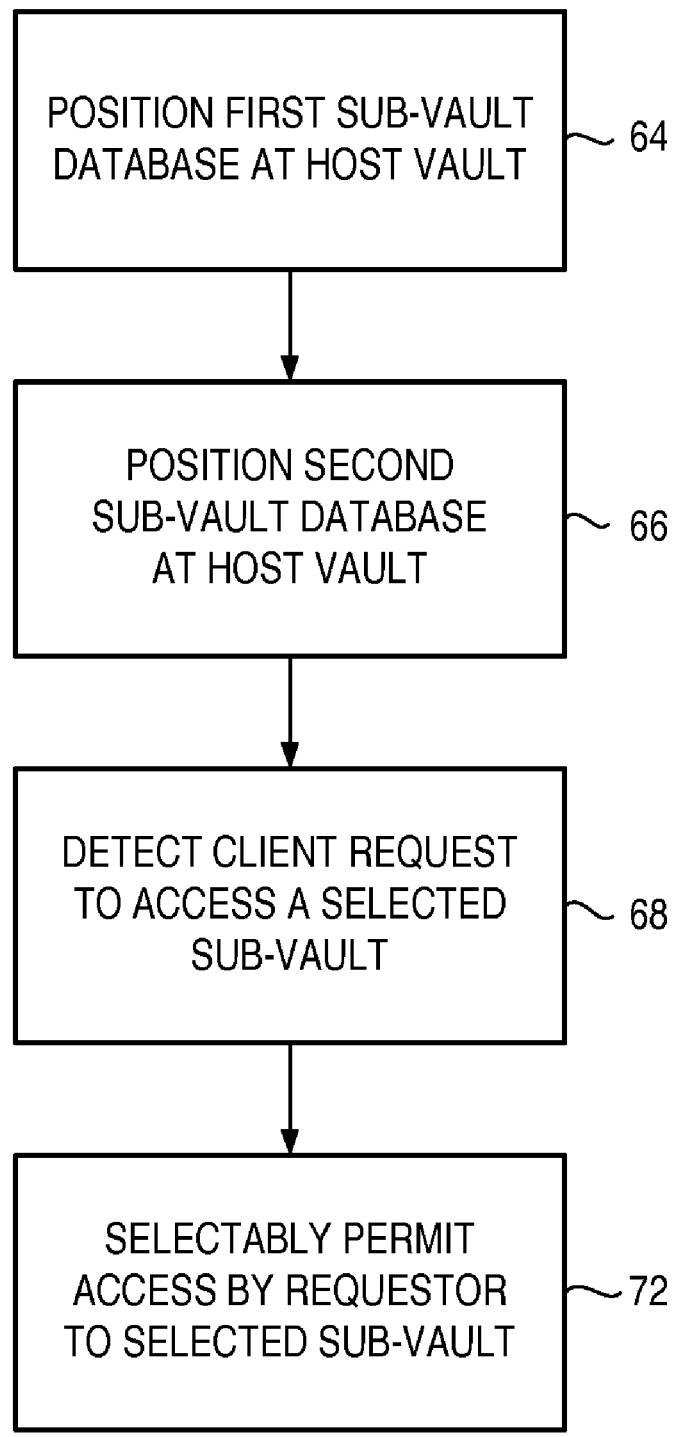
FIG. 3 illustrates a method flow diagram illustrating the method of operation of an embodiment of the present invention.

FIG. 3 illustrates a method, shown generally at 62, representative of operation of an embodiment of the present invention. The method provides controlled access to data.

First, and as indicated by the block 64, a first sub-vault database is positioned at a host vault. The first sub-vault database stores first data associated with a first compliance standard. And, as indicated by the block 66, a second sub-vault database is positioned at the host vault. The second sub-vault database stores second data associated with a second compliance standard.

Then, and as indicated by the block 68, a client request to access a selected sub-vault database of the first and second databases is detected. And, as indicated by the block 72, access to the host vault and to the selected sub-vault is permitted if the client request is of selected values.

Thereby, remote storage of data is effectuated. The data that is remotely stored is accessed, manipulated, and retrieved in conformity with a compliance standard. A user need not bear completely the burdens of maintaining a database system in conformity with a compliance standard. Rather, the burdens associated with comporting with the compliance standard are shared amongst different users of the remote facility.

The previous descriptions are of preferred examples for implementing the invention, and the scope of the invention should not necessarily be limited by this description. The scope of the present invention is defined by the following claims.

What is claimed is:

1. A secured data depository assembly, said secured data depository assembly comprising:

a host vault;

a first sub-vault configured to read, write, and manipulate first data in accordance with a first compliance standard at said host vault;

a second sub-vault configured to read, write, and manipulate second data in accordance with a second compliance standard that is different from the first compliance standard at said host vault;

an access controller adapted to receive client requests to access a selected sub-vault of said first and second sub-vaults, respectively, said access controller configured to control client access to both the host vault and to the selected sub-vault responsive to the client request;

wherein each sub-vault comprises a separate database;

wherein each sub-vault, responsive to a received client request, is configured to manipulate select data of the first or second data stored in the sub-vault by performing operations, in accordance with the first or second compliance standard, that use the select data stored in the sub-vault without providing the select data outside the sub-vault.

2. The secured data depository assembly of claim 1 wherein the client request received by said access controller comprises a client identifier and vault operator issued certificate and wherein said access controller provides the client access to said vault responsive to the client identifier and the vault operator issued certificate comporting with a selected value requirement.

3. The secured data depository assembly of claim 2 wherein said access controller further comprises a comparator for comparing values of the client identifier and of the vault operator issued certificate with the selected value requirement.

4. The secured data depository assembly of claim 2 wherein said access controller further comprises a certificate issuer and wherein the operator issued certificate contained in the client request is issued initially by the certificate issuer of said access controller.

5. The secured data depository assembly of claim 1 wherein client access controlled by said access controller comprises access to store data at the selected sub-vault database.

6. The secured data depository assembly of claim 1 wherein said access controller controls access to said first sub-vault database responsive to access requirements of the first compliance standard.

7. The secured data depository assembly of claim 1 wherein said controller controls access to said second sub-vault database responsive to access requirements of the second compliance standard.

8. The secured data depository assembly of claim 1 wherein the first compliance standard differs with the second compliance standard.

9. The secured data depository of claim 1 wherein client access controlled by said access controller comprises access to said first sub-vault database to perform a first compliance standard related functions.

10. The secured data depository of claim 1 wherein client access controlled by said access controller comprises access to said second sub-vault database to perform second compliance standard related functions.

11. The secured data depository of claim 1 further comprising an auditor adapted to receive indications of the client access to the selected sub-vault, said auditor configured to create and maintain audit records of access to the selected sub-vault.

12. The secured data depository of claim 11 wherein said access controller further controls access to the audit records maintained by said auditor.

13. The secured data depository assembly of claim 1 wherein the client request that said access controller receives is routed thereto by way of a public data network.

14. A method for providing controlled access to data, said method comprising the operations of:
   positioning a first sub-vault at a host vault, the first sub-vault being configured for reading, writing, and manipulating first data in accordance with a first compliance standard;
   positioning a second sub-vault at the host vault, the second sub-vault being configured for, reading, writing, and manipulating second data in accordance with a second compliance standard that is different from the first compliance standard;
   detecting a client request to access a selected sub-vault of the first and second sub-vaults, respectively, positioned during said operations of positioning;
   permitting access to the host vault and to the selected sub-vault if the client request is of selected values; and
   configuring each sub-vault to manipulate select data of the first or second data stored in the sub-vault, responsive to a received client request, by performing operations, in accordance with the first or second compliance standard, that use the select data stored in the sub-vault without providing the select data outside the sub-vault.

15. The method of claim 14 wherein the access is permitted during said operation of permitting when the client request contains a selected client identifier and a selected vault operator issued certificate.

16. The method of claim 15 wherein said operation of permitting further comprises the operation of comprising the values of the client request with values of the selected client identifier and of the selected vault operator.

17. The method of claim 14 wherein the access permitted during said operation of permitting access comprises access in conformity with a selected compliance standard of the first compliance standard and the second compliance standard, corresponding to the selected sub-vault to which client access is requested.

18. The method of claim 14 further comprising the operation of creating an audit record of access permitted responsive to said operation of permitting access.

19. The secured data depository assembly of claim 1, wherein the vault returns a unique identifier to a client in response to a received client request, the identifier providing a mapping between the client and sensitive client data stored at the vault based on the request, and wherein the vault is configured to respond to client queries including the identifier as identification of the sensitive client data.

* * * * *

UNITED STATES PATENT AND TRADEMARK OFFICE
CERTIFICATE OF CORRECTION

| | | |
|---|---|---|
| PATENT NO. | : 7,992,002 B2 | Page 1 of 1 |
| APPLICATION NO. | : 11/456165 | |
| DATED | : August 2, 2011 | |
| INVENTOR(S) | : Bruce W. Bradbury | |

It is certified that error appears in the above-identified patent and that said Letters Patent is hereby corrected as shown below:

In column 10, line 2, in Claim 14, delete "for," and insert -- for --, therefor.

Signed and Sealed this
Twenty-first Day of February, 2012

David J. Kappos
*Director of the United States Patent and Trademark Office*